United States Patent
Burstein

(10) Patent No.: US 7,762,816 B2
(45) Date of Patent: Jul. 27, 2010

(54) METHOD AND SYSTEM FOR AUTOMATED ITEM DEVELOPMENT FOR LANGUAGE LEARNERS

(75) Inventor: Jill S. Burstein, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 1131 days.

(21) Appl. No.: 11/358,795

(22) Filed: Feb. 21, 2006

(65) Prior Publication Data

US 2006/0190242 A1    Aug. 24, 2006

Related U.S. Application Data

(60) Provisional application No. 60/655,125, filed on Feb. 22, 2005.

(51) Int. Cl.
*G09B 3/00* (2006.01)
*G06F 17/27* (2006.01)
*G06F 17/28* (2006.01)
*G10L 21/00* (2006.01)

(52) U.S. Cl. .................. 434/322; 704/270.1; 704/9; 704/270; 704/275

(58) Field of Classification Search .............. 704/2, 704/9, 270–275; 434/322
See application file for complete search history.

(56) References Cited

U.S. PATENT DOCUMENTS

| | | | |
|---|---|---|---|
| 3,382,588 A | 5/1968 | Serrell et al. | |
| 3,501,851 A | 3/1970 | Price, Jr. et al. | |
| 3,761,877 A | 9/1973 | Fernald | |
| 4,067,122 A * | 1/1978 | Fernandez et al. | 434/157 |
| 4,360,345 A | 11/1982 | Hon | |
| 4,475,239 A | 10/1984 | VanRaamsdonk | |
| 4,518,361 A | 5/1985 | Conway | |
| 4,547,161 A | 10/1985 | Manning | |
| 4,593,904 A | 6/1986 | Graves | |
| 4,686,522 A | 8/1987 | Hernandez et al. | |
| 4,813,013 A | 3/1989 | Dunn | |
| 4,931,018 A | 6/1990 | Herbst et al. | |
| 4,947,322 A | 8/1990 | Tenma et al. | |
| 5,002,491 A | 3/1991 | Abrahamson et al. | |
| 5,010,495 A | 4/1991 | Willetts | |
| 5,011,413 A | 4/1991 | Ferris et al. | |
| 5,040,131 A | 8/1991 | Torres | |
| 5,100,329 A | 3/1992 | Deesen et al. | |

(Continued)

OTHER PUBLICATIONS

International Search Report of PCT Application No. PCT/US2006/006308, Mar. 5, 2008, 4 pages.

(Continued)

*Primary Examiner*—Richemond Dorvil
*Assistant Examiner*—Eric Yen
(74) *Attorney, Agent, or Firm*—Jones Day

(57) ABSTRACT

A method of developing a translation exercise is disclosed. A grammatical structure may be received. Each of one or more text segments in a first language may be translated into a corresponding text segment in a second language. Each text segment in the first language may include one or more sentences. A text segment may be selected as a prompt for a translation exercise. The selected text segment may include a text segment in the second language having the grammatical structure and/or a text segment in the first language corresponding to a text segment in the second language having the grammatical structure.

24 Claims, 2 Drawing Sheets

U.S. PATENT DOCUMENTS

| | | | |
|---|---|---|---|
| 5,211,564 | A | 5/1993 | Martinez et al. |
| 5,503,560 | A * | 4/1996 | Stentiford .................. 434/167 |
| 6,119,077 | A * | 9/2000 | Shinozaki ...................... 704/3 |
| 6,431,875 | B1 * | 8/2002 | Elliott et al. ................ 434/322 |
| 6,711,543 | B2 * | 3/2004 | Cameron ................... 704/270 |
| 6,865,532 | B2 * | 3/2005 | Anderson .................. 704/257 |
| 6,988,063 | B2 | 1/2006 | Tokuda |
| 7,085,707 | B2 | 8/2006 | Milner |
| 2002/0018984 | A1 * | 2/2002 | Ho et al. .................... 434/362 |
| 2002/0031751 | A1 * | 3/2002 | Wen et al. .................. 434/118 |
| 2002/0115048 | A1 * | 8/2002 | Meimer ..................... 434/322 |
| 2003/0023423 | A1 * | 1/2003 | Yamada et al. ................ 704/2 |
| 2003/0154067 | A1 | 8/2003 | Wen et al. |
| 2003/0208353 | A1 | 11/2003 | Ueda |

OTHER PUBLICATIONS

Dorr. Large-Scale Dictionary Construction for Foreign Language Tutoring and Interlingual Machine Translation. Machine Translation, 1977, 12(4), pp. 271-325, especially pp. 274-280.

Tokuda et al. "An Online Tutoring System for Language Translation," Jul.-Sep. 2001, MultiMedia, IEEE , vol. 8, No. 3, pp. 46-55.

http://research.microsoft.com/displayArticle.aspx?id=604.

http://www.edweek.org/ew/articles/2004/10/06/06translate.h24.html.

http://news.bostonherald.com/localRegional/view.bg?articleid=53047.

http://www.yomiuri.co.jp/newse/20041109wob1.htm.

http://www.ctb.com/products/product_summary.jsp?FOLDER%3C%3Efolder_id=14084743952170818&ASSORTMENT%3C%East_id=1408474395213825&bmUID=1098718828769.

* cited by examiner

METHOD AND SYSTEM FOR AUTOMATED ITEM DEVELOPMENT FOR LANGUAGE LEARNERS

A. CROSS REFERENCE TO RELATED APPLICATIONS

This Application claims priority to and incorporates herein by Reference to U.S. Provisional Application No. 60/655,125 titled Method and System for Automated Item Development for Language Learners, filed on Feb. 22, 2005 with the United States Patent and Trademark Office.

B. BACKGROUND

Machine translation has entered the marketplace as a beneficial technology for every day tasks and for business purposes. For instance, commercial applications are used on the Internet for the automatic translation of Web pages and news articles. In addition, companies offer software that automatically translates Web sites for localization purposes. Other commercial software provides translations of business documents, such as memoranda and e-mails.

Microsoft's Writing Wizard™ is an exemplary educational tool that uses machine translation to assist with business writing. The Writing Wizard™ suggests idiomatic phrases to English language learners based on submitted foreign language phrases and/or word collocation. In addition, software products incorporating machine translation are beginning to be used and/or developed by large public school districts, such as the school districts in Los Angeles, New York and Philadelphia, to provide translations of school-related documents to parents who do not speak English. However, no currently available software program provides a user with the ability to automatically produce a plurality of translation exercises that permit the evaluation of language learners.

What are needed are a method and system for automatically generating a plurality of translation exercises that language learners having a particular primary language have difficulty translating.

A need exists for providing such a method and system in a learning environment and/or to an instructor.

A need exists for a method of reducing the time required for an instructor to generate assessment items for a language assessment.

A further need exists for a method of generating an increased number of assessment items directed to a particular translation difficulty for language learners having a particular primary dialect.

The present disclosure is directed to solving one or more of the above-listed problems.

C. SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to a "sentence" is a reference to one or more sentences and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a method of developing a translation exercise may include receiving a grammatical structure, for each of one or more text segments in a first language, translating the text segment in the first language into a corresponding text segment in a second language, and selecting a selected text segment as a prompt for a translation exercise. The selected text segment may include one or more of a text segment in the second language having the grammatical structure, and a text segment in the first language corresponding to a text segment in the second language having the grammatical structure.

In an embodiment, a processor-readable storage medium may contain one or more programming instructions for performing a method of developing a translation exercise. The method of developing a translation exercise may include receiving a grammatical structure, for each of one or more text segments in a first language, translating the text segment in the first language into a corresponding text segment in a second language, and selecting a selected text segment as a prompt for a translation exercise. The selected text segment may include one or more of a text segment in the second language having the grammatical structure, and a text segment in the first language corresponding to a text segment in the second language having the grammatical structure.

D. BRIEF DESCRIPTION OF THE DRAWINGS

Aspects, features, benefits and advantages of the embodiments of the present invention will be apparent with regard to the following description, appended claims and accompanying drawings where:

E. DETAILED DESCRIPTION

The automatic generation of assessment items may enable teachers of language learners to increase the number of items they can create for assignments, such as practice exercises and assessments, over the number of items they may otherwise be able to generate manually. In an embodiment, such translation exercises may be created to provide language-learning students with structures that are typically difficult to decipher. The difficulty of such structures may be dependent upon the primary language of the students and the language being learned.

Figure 1:
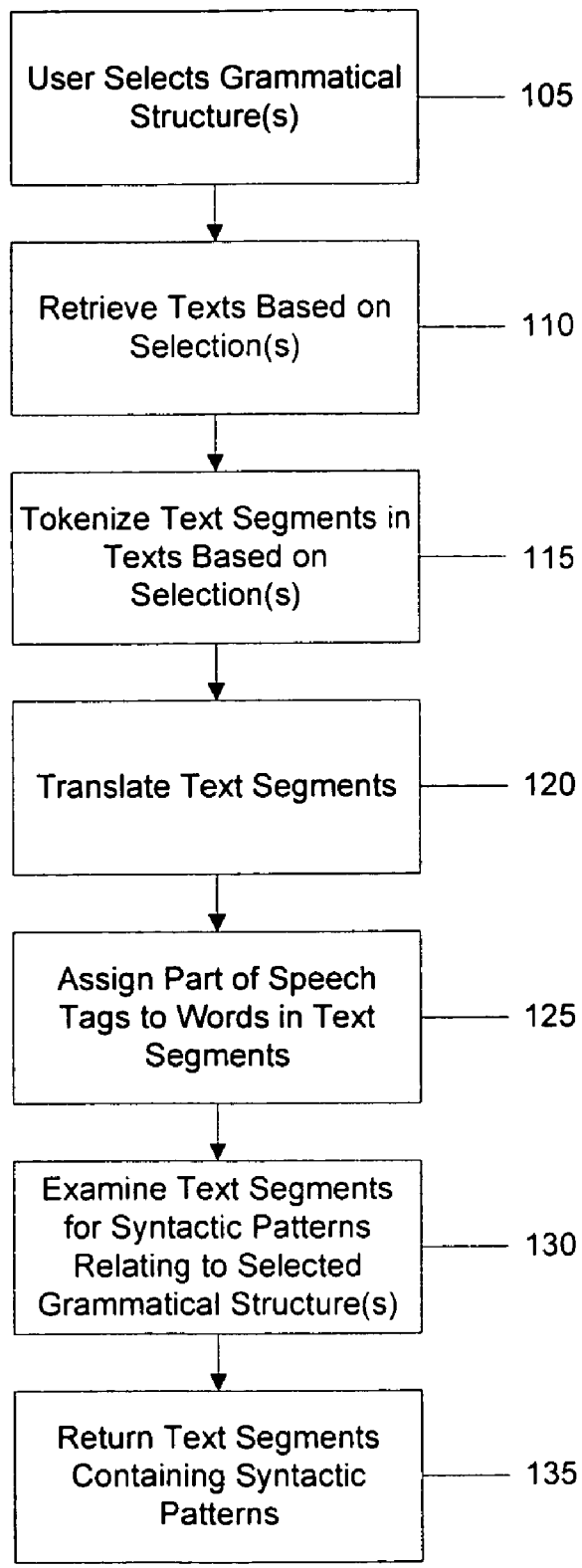
FIG. 1 depicts a flow diagram of an exemplary method of developing assessment items for non-native speakers according to an embodiment.

FIG. 1 depicts a flow diagram of an exemplary method of developing assessment items for non-native speakers according to an embodiment. In an embodiment, a user may select 105 one or more options pertaining to different grammatical structures from, for example, a menu. For example, the grammatical structures may include "Singular Subject and Singular Verb" (The boy likes baseball.) and/or "Abstract Nouns not Requiring Definite Determiners" (life, marriage, fun). The user's selection may be received by a software program, which generates 110 a query to a database including a plurality of texts in the student's native language. Other methods of obtaining one or more texts may also be used within the scope of this disclosure.

The texts may be input 115 into a tokenizer that identifies the words in each text that correspond to a text segment. In an embodiment, a text segment may correspond to a sentence within a text. In an alternate embodiment, each text may represent a text segment. Other and/or additional definitions of a text segment may be used within the scope of this disclosure. A machine translation system may then translate 120 the text segments into the non-native language. In an embodiment, a translation may be performed for each text segment.

Each word in the text-segment-based non-native language translations may be identified and tagged 125 as being a particular syntactic part-of-speech, such as a noun, a verb and the like. In an embodiment, the output of the part-of-speech tagger may have the following form for each processed word: $word_$TAG, where $word is the translated word and $TAG is a part-of-speech tag. Exemplary part-of-speech tags may include NNP for a proper noun and VBZ for a singular verb. An exemplary text segment as parsed by the part-of-speech tagger may appear as follows (if the translation is performed into English):

President_NNP Mubarak_NNP wants_VBZ the_ATI Arab_JJ nation_NN to_TO be_BE ready_JJ but_CC without_IN the_ATI least_AP nervousness_NN or_CC agitation_NN.

A regular expression program may be used to capture 130 syntactic patterns that relate to each grammatical structure selectable by the user. For example, in the above structure, the regular expression program may be directed to select a text segment that includes the consecutive string "$word_NNP+ $word_VBZ." The translation of a text segment including the appropriate regular expression may then be captured. Other programs or methods of identifying syntactic patterns that correspond to a grammatical structure may also be used within the scope of this disclosure.

The original, non-translated native language text segment may be returned 135 as a candidate text segment for the translation exercise. In this manner, native language text may be selected as a candidate text segment if the translation of the text into the non-native language includes the requested structure. A user may use one or more of the candidate text segments to create translation exercises from the language learner's native language into the non-native language.

In an alternate embodiment, the translation of a text segment that is captured by, for example, the regular expression program may be used as a candidate text segment for a translation exercise. In this embodiment, a user may use one or more of the candidate text segments to create translation exercises from a non-native language into the language learner's native language.

In an embodiment, a translation exercise may include a plurality of sentences, one or more paragraphs and/or an entire text. Each translation exercise may include one or more structures that pose difficulty for a group of non-native language speakers.

Figure 2:
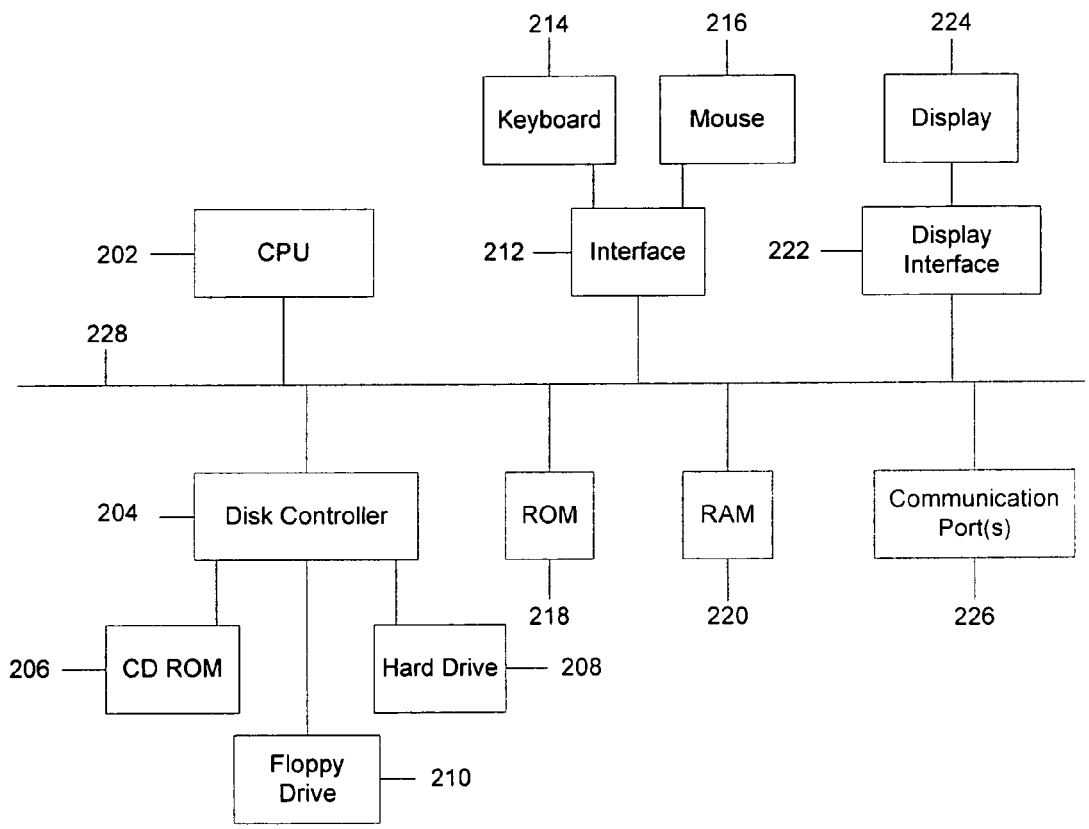
FIG. 2 is a block diagram of exemplary internal hardware that may be used to contain or implement the program instructions of a system embodiment.

FIG. 2 is a block diagram of exemplary hardware that may be used to contain or implement the program instructions of a system embodiment. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick.

An embedded system may optionally be used to perform one, some or all of the described operations. Likewise, a multiprocessor system may optionally be used to perform one, some or all of the described operations.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A computer-implemented method of developing a translation exercise, the method comprising:
receiving a grammatical structure;
for each of a plurality of text segments in a first language, translating the text segment in the first language into a corresponding text segment in a second language using a processing system; and
selecting with the processing system a selected text segment from the plurality of text segments as a prompt for a translation exercise based on whether the text segment in the second language that corresponds to the selected text segment has said grammatical structure; and
storing the selected text segment in a computer-readable memory.

2. The method of claim 1, further comprising:
for each text segment in the second language, associating a tag with each word in the text segment, wherein each tag corresponds to a part-of-speech for the associated word.

3. The method of claim 2, further comprising:
determining whether a syntactic pattern for the grammatical structure matches one or more tags associated with one or more words of a text segment in the second language.

4. The method of claim 1, further comprising:
retrieving one or more texts from a storage medium; and
tokenizing each text into the one or more text segments in the first language.

5. The method of claim 1 wherein the one or more text segments in the first language comprise a sentence.

6. The method of claim 1 wherein the one or more text segments in the first language comprise a plurality of sentences.

7. The method of claim 1, comprising creating said translation exercise for application as a practice exercise or an assessment that requires a student to translate the selected text segment from the first language into the second language, the first language being a native language and the second language being a non-native language.

8. The method of claim 1, comprising creating said translation exercise for application as a practice exercise or an assessment that requires a student to translate the selected text segment from the second language into the first language, the first language being a native language and the second language being a non-native language.

9. A non-transitory computer readable storage medium containing one or more programming instructions for developing a translation exercise, the one or more programming instructions causing a processing system to execute steps comprising:
receiving a grammatical structure;
for each of a plurality of text segments in a first language, translating the text segment in the first language into a corresponding text segment in a second language; and
selecting a selected text segment from the plurality of text segments as a prompt for a translation exercise based on whether the text segment in the second language that corresponds to the selected text segment has said grammatical structure; and
storing the selected text segment in a computer-readable memory.

10. The computer readable storage medium of claim 9, further containing one or more programming instructions for performing the following:
for each text segment in the second language, associating a tag with each word in the text segment, wherein each tag corresponds to a part-of-speech for the associated word.

11. The computer readable storage medium of claim 10, further containing one or more programming instructions for performing the following:
determining whether a syntactic pattern for the grammatical structure matches one or more tags associated with one or more words of a text segment in the second language.

12. The computer readable storage medium of claim 9, further containing one or more programming instructions for performing the following:
retrieving one or more texts from a storage medium; and
tokenizing each text into the one or more text segments in the first language.

13. The computer readable storage medium of claim 9 wherein the one or more text segments in the first language comprise a sentence.

14. The computer readable storage medium of claim 9 wherein the one or more text segments in the first language comprise a plurality of sentences.

15. The computer readable storage medium of claim 9, containing one or more programming instructions for creating said translation exercise for application as a practice exercise or an assessment that requires a student to translate the selected text segment from the first language into the second language, the first language being a native language and the second language being a non-native language.

16. The computer readable storage medium of claim 9, containing one or more programming instructions for creating said translation exercise for application as a practice exercise or an assessment that requires a student to translate the selected text segment from the second language into the first language, the first language being a native language and the second language being a non-native language.

17. A computer-implemented system for developing a translation exercise, the system comprising:
a processing system; and
a computer-readable memory coupled to the processing system, the computer-readable memory containing one or more programming instructions,
the programming instructions when executed causing the processing system to execute steps comprising:
receiving a grammatical structure;
for each of a plurality of text segments in a first language, translating the text segment in the first language into a corresponding text segment in a second language using a data processor; and
selecting a selected text segment from the plurality of text segments as a prompt for a translation exercise based on whether the text segment in the second language that corresponds to the selected text segment has said grammatical structure using a data processor; and
storing the selected text segment in a computer-readable memory.

18. The system of claim 17, wherein the processing system is further configured to execute steps comprising:
for each text segment in the second language, associating a tag with each word in the text segment, wherein each tag corresponds to a part-of-speech for the associated word.

19. The system of claim 18, wherein the processing system is further configured to execute steps comprising:
determining whether a syntactic pattern for the grammatical structure matches one or more tags associated with one or more words of a text segment in the second language.

20. The system of claim 17, wherein the processing system is further configured to execute steps comprising:
retrieving one or more texts from a storage medium; and
tokenizing each text into the one or more text segments in the first language.

21. The system of claim 17 wherein the one or more text segments in the first language comprise a sentence.

22. The system of claim 17 wherein the one or more text segments in the first language comprise a plurality of sentences.

23. The system of claim 17, wherein the processing system is configured to create said translation exercise for application as a practice exercise or an assessment that requires a student to translate the selected text segment from the first language into the second language, the first language being a native language and the second language being a non-native language.

24. The system of claim 17, wherein the processing system is configured to create said translation exercise for application as a practice exercise or an assessment that requires a student to translate the selected text segment from the second language into the first language, the first language being a native language and the second language being a non-native language.

* * * * *